(12) United States Patent
Ma et al.

(10) Patent No.: US 12,308,929 B2
(45) Date of Patent: May 20, 2025

(54) MULTIPLE-INPUT MULTIPLE-OUTPUT RECEIVER FOR WIRELESS FIDELITY, AND ELECTRONIC DEVICE

(71) Applicant: SPREADTRUM COMMUNICATIONS (SHANGHAI) CO., LTD., Shanghai (CN)

(72) Inventors: Tengfei Ma, Shanghai (CN); Guochu Chen, Shanghai (CN); Zhigang Yan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 18/260,043

(22) PCT Filed: Nov. 16, 2021

(86) PCT No.: PCT/CN2021/131006
§ 371 (c)(1),
(2) Date: Jun. 30, 2023

(87) PCT Pub. No.: WO2022/142806
PCT Pub. Date: Jul. 7, 2022

(65) Prior Publication Data
US 2024/0072875 A1 Feb. 29, 2024

(30) Foreign Application Priority Data
Dec. 31, 2020 (CN) .......................... 202011624166.2

(51) Int. Cl.
*H04B 7/0413* (2017.01)
*H04B 7/08* (2006.01)

(52) U.S. Cl.
CPC ......... *H04B 7/0802* (2013.01); *H04B 7/0413* (2013.01)

(58) Field of Classification Search
CPC ........................... H04B 7/0413; H04B 7/0802
See application file for complete search history.

(56) References Cited

U.S. PATENT DOCUMENTS

| 6,018,647 A | 1/2000 | Fitzgerald |
| 7,385,945 B1 | 6/2008 | Olson et al. |

(Continued)

FOREIGN PATENT DOCUMENTS

| CN | 1169630 A | 1/1998 |
| CN | 1601923 A | 3/2005 |

(Continued)

OTHER PUBLICATIONS

International Search Report (PCT/CN2021/131006); Date of Mailing: Jan. 29, 2022.

(Continued)

*Primary Examiner* — Rahel Guarino
(74) *Attorney, Agent, or Firm* — Wiersch Law Group (57) ABSTRACT

A multiple-input multiple-output (MIMO) receiver for Wireless Fidelity (Wi-Fi), and an electronic device. The MIMO receiver for Wi-Fi includes n antennas, an energy detection circuitry, a multilink gating circuitry, receiving links, a frequency offset adjustment circuitry, and a gating control circuitry. The multilink gating circuitry includes one energy detection gating output terminal coupled to the frequency offset adjustment circuitry through the energy detection circuitry and n−1 non-energy detection gating output terminals coupled to the frequency offset adjustment circuitry. The multilink gating circuitry connects each gating input terminal to one of the gating output terminals. The gating control circuitry periodically obtains a signal strength of each of the receiving links, and controls, based on the signal strength, the multilink gating circuitry to connect the gating input terminal corresponding to the receiving link that meets (Continued)

a preset condition to the energy detection gating output terminal.

20 Claims, 8 Drawing Sheets

(56) References Cited

U.S. PATENT DOCUMENTS

| | | |
|---|---|---|
| 2003/0153358 A1 | 8/2003 | Moon et al. |
| 2007/0293177 A1 | 12/2007 | Li |
| 2012/0071124 A1 | 3/2012 | Leoncavallo |
| 2013/0107995 A1 | 5/2013 | Husted |
| 2016/0127028 A1 | 5/2016 | Wang et al. |
| 2016/0345378 A1 | 11/2016 | Smith |
| 2017/0086141 A1 | 3/2017 | Gal |
| 2019/0229820 A1 | 7/2019 | Scaglione et al. |
| 2021/0058115 A1* | 2/2021 | Yu .................. H04B 1/0057 |

FOREIGN PATENT DOCUMENTS

| | | | |
|---|---|---|---|
| CN | 1698285 | A | 11/2005 |
| CN | 1883145 | A | 12/2006 |
| CN | 1998146 | A | 7/2007 |
| CN | 105828394 | A | 8/2016 |
| CN | 211981858 | U | 11/2020 |

OTHER PUBLICATIONS

First Office Action(CN202011624166.2); Date of Mailing: Sep. 3, 2021.
Notice Of Allowance(CN202011624166.2); Date of Mailing: Feb. 28, 2022.

* cited by examiner

MULTIPLE-INPUT MULTIPLE-OUTPUT RECEIVER FOR WIRELESS FIDELITY, AND ELECTRONIC DEVICE

CROSS-REFERENCE TO RELATED APPLICATION(S)

The present disclosure is a National Phase of International Patent Application No. PCT/CN2021/131006, filed on Nov. 16, 2021, which claims priority to Chinese Patent Application No. 202011624166.2, filed on Dec. 31, 2020, the contents of which are incorporated herein by reference in their entireties.

TECHNICAL FIELD

The present disclosure relates to the field of communication technologies and, in particular, to a multiple-input multiple-output (MIMO) receiver for Wireless Fidelity (Wi-Fi), and an electronic device.

BACKGROUND

In a current WI-FI evolution process, 802.11n to 802.11ac and 802.11ax support MIMO. Different positions of multiple antennas in an actual MIMO receiver lead to different strengths and signal-to-noise ratios (SNRs) of signals received by different antennas. Based on the difference of signals on different receiving links, many hardware structures are required to be adjusted, resulting in high costs and power consumption.

SUMMARY

The present disclosure provides a MIMO receiver for Wi-Fi and an electronic device. Costs and power consumption can be reduced by simplifying hardware in the receiver.

In a first aspect, a multiple-input multiple-output (MIMO) receiver for Wireless Fidelity (Wi-Fi) is provided, including: n antennas, where n≥2; an energy detection circuitry; a multilink gating circuitry; receiving links one-to-one corresponding to the antennas, wherein the multilink gating circuitry comprises gating input terminals one-to-one corresponding to the receiving links, and the receiving links each comprise an input terminal coupled to the corresponding antenna and an output terminal coupled to the corresponding gating input terminal of the multilink gating circuitry; a frequency offset adjustment circuitry, wherein the multilink gating circuitry comprises one energy detection gating output terminal coupled to the frequency offset adjustment circuitry through the energy detection circuitry and n−1 non-energy detection gating output terminals each coupled to the frequency offset adjustment circuitry, and each of the gating input terminals is connected to one of the gating output terminals through the multilink gating circuitry; and a gating control circuitry coupled to the multilink gating circuitry, wherein the gating control circuitry periodically obtains a signal strength of each of the receiving links, and controls, based on the signal strength of each of the receiving links, the multilink gating circuitry to connect the gating input terminal corresponding to the receiving link that meets a preset condition to the energy detection gating output terminal.

In some embodiments, the gating control circuitry periodically obtains the signal strength of each of the receiving links, and controls the multilink gating circuitry to connect the gating input terminal corresponding to the receiving link having the greatest signal strength to the energy detection gating output terminal.

In some embodiments, the gating control circuitry periodically obtains the signal strength and a signal-to-noise ratio (SNR) of each of the receiving links, and controls the multilink gating circuitry to connect the gating input terminal corresponding to the receiving link having the greatest signal strength and an SNR within a preset SNR range to the energy detection gating output terminal.

In some embodiments, each of the receiving links comprises an automatic gain control (AGC) circuitry.

In some embodiments, each of the receiving links comprises a low noise amplifier (LNA), a down-conversion circuitry, and the AGC circuitry that are sequentially coupled between the input terminal and the output terminal.

In some embodiments, the energy detection gating output terminal is coupled to the energy detection circuitry sequentially through an analog-to-digital converter (ADC) and a correlation detection circuitry; and each of the non-energy detection gating output terminals is coupled to the frequency offset adjustment circuitry sequentially through an ADC and a correlation detection circuitry.

In some embodiments, each of the receiving links comprises the LNA, the down-conversion circuitry, the AGC circuitry, and an ADC that are sequentially coupled between the input terminal and the output terminal.

In some embodiments, the energy detection gating output terminal is coupled to the energy detection circuitry through a correlation detection circuitry; and each of the non-energy detection gating output terminals is coupled to the frequency offset adjustment circuitry through a correlation detection circuitry.

In some embodiments, each of the receiving links comprises the LNA, the down-conversion circuitry, the AGC circuitry, an ADC, and a correlation detection circuitry that are sequentially coupled between the input terminal and the output terminal.

In some embodiments, the gating control circuitry periodically obtains a received signal strength indication (RSSI) of a Beacon frame of each of the receiving links, and controls the multilink gating circuitry to connect the gating input terminal corresponding to the receiving link having the greatest RSSI to the energy detection gating output terminal.

In some embodiments, the MIMO receiver for Wi-Fi further includes: a symbol timing synchronization circuitry coupled to the frequency offset adjustment circuitry.

In a second aspect, an electronic device is provided, including the multiple-input multiple-output (MIMO) receiver for Wireless Fidelity (Wi-Fi) described above.

DESCRIPTION OF EMBODIMENTS

The terms used in the embodiments of the present disclosure are used only to explain the certain embodiments of the present disclosure, and are not intended to limit the present disclosure. In the embodiments of the present disclosure, "for example", "exemplary", or the like is used to represent giving an example, an illustration, or a description. Exactly, use of "for example", "exemplary", or the like is intended to present a related concept in a specific manner. It should be understood that in the description of the embodiments of the present disclosure, "coupled" includes a direct connection or an indirect connection through coupling.

First, an electronic device in the present disclosure is described. The electronic device in the present disclosure may be a mobile phone, a router, a tablet computer, a personal computer (PC), a personal digital assistant (PDA), a smart watch, a netbook, a wearable electronic device, an augmented reality (AR) device, a virtual reality (VR) device, a vehicle-mounted device, an unmanned aerial vehicle (UAV) device, a smart car, a smart sounder, a robot, smart glasses, or the like. The electronic device includes a receiver configured to perform wireless communication with another electronic device. The receiver in the present disclosure is a MIMO receiver for Wi-Fi.

Figure 1:
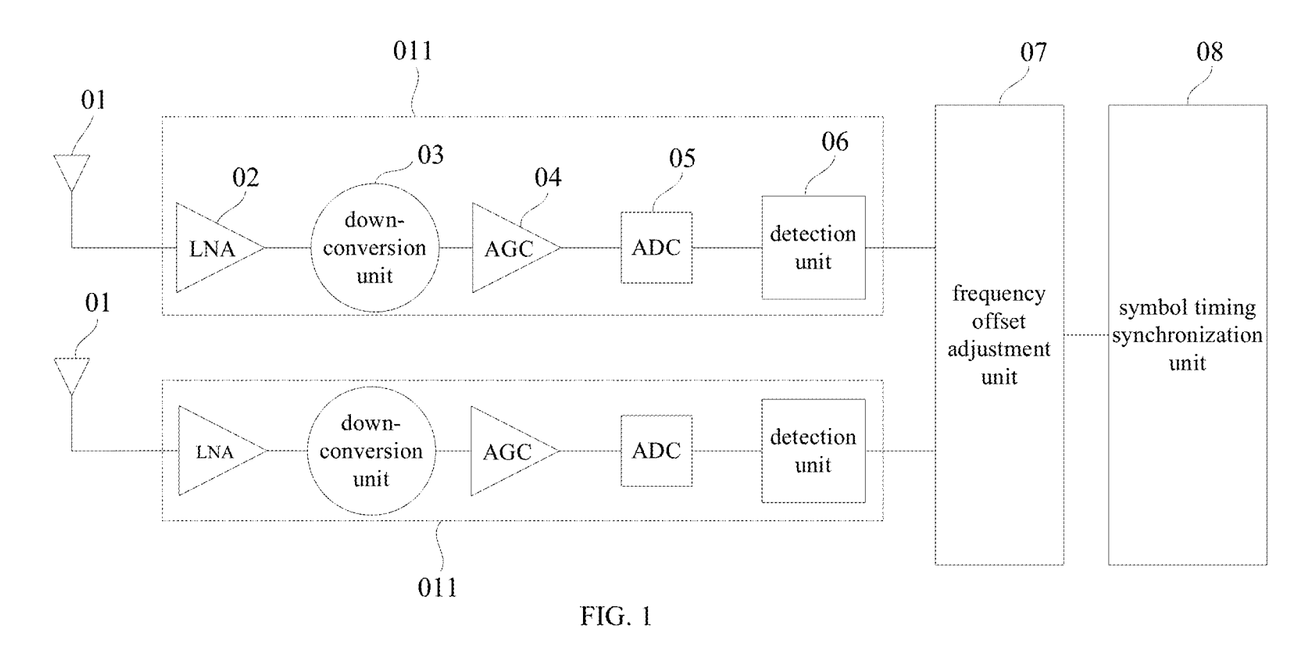
FIG. 1 is a structural block diagram of a MIMO receiver for Wi-Fi.

MIMO is a wireless communication technology through a plurality of transmit antennas and a plurality of receive antennas. As shown in FIG. 1, FIG. 1 is a structural block diagram of a MIMO receiver for Wi-Fi. The receiver includes a plurality of antennas 01. Each antenna 01 corresponds to one receiving link 011. The receiving link 011 includes a low noise amplifier (LNA) 02, a down-conversion unit 03, an automatic gain control (AGC) unit 04, an analog-to-digital converter (ADC) 05, and a detection unit 06. An input terminal of the receiving link 011 is coupled to a corresponding antenna 01. An output terminal of the receiving link 011 is coupled to a frequency offset adjustment unit 07. The frequency offset adjustment unit 07 is coupled to a symbol timing synchronization unit 08. To enable each receiving link 011 to obtain a maximum dynamic range, each receiving link 011 needs to separately modulate the AGC. After the ADC converts a signal of each receiving link 011 into a digital signal, the detection unit 06 needs to perform correlation detection and energy detection. The AGC is adjusted for each receiving link 011 based on results of the correlation detection and energy detection. Results of energy detection or correlation detection of the plurality of receiving links 011 after the AGC adjustment are integrated. The frequency offset adjustment unit 07 adjusts a frequency offset. The symbol timing synchronization unit 08 performs symbol timing synchronization. The signal is decoded based on amplitude and the SNR of the received signal after the AGC adjustment, the frequency offset adjustment, and the symbol timing synchronization. A subsequent packet is demodulated. As the required throughput of the receiver is increasing, there are growing quantities of antennas 01 and receiving links 011. Hardware and power consumption resources required by each receiving link 011 are multiplied. For example, the detection unit 06 needs to perform energy detection on each receiving link 011 when the signal is detected as weak. Therefore, the MIMO receiver shown in FIG. 1 has many hardware structures, resulting in high costs and power consumption.

Figure 2:
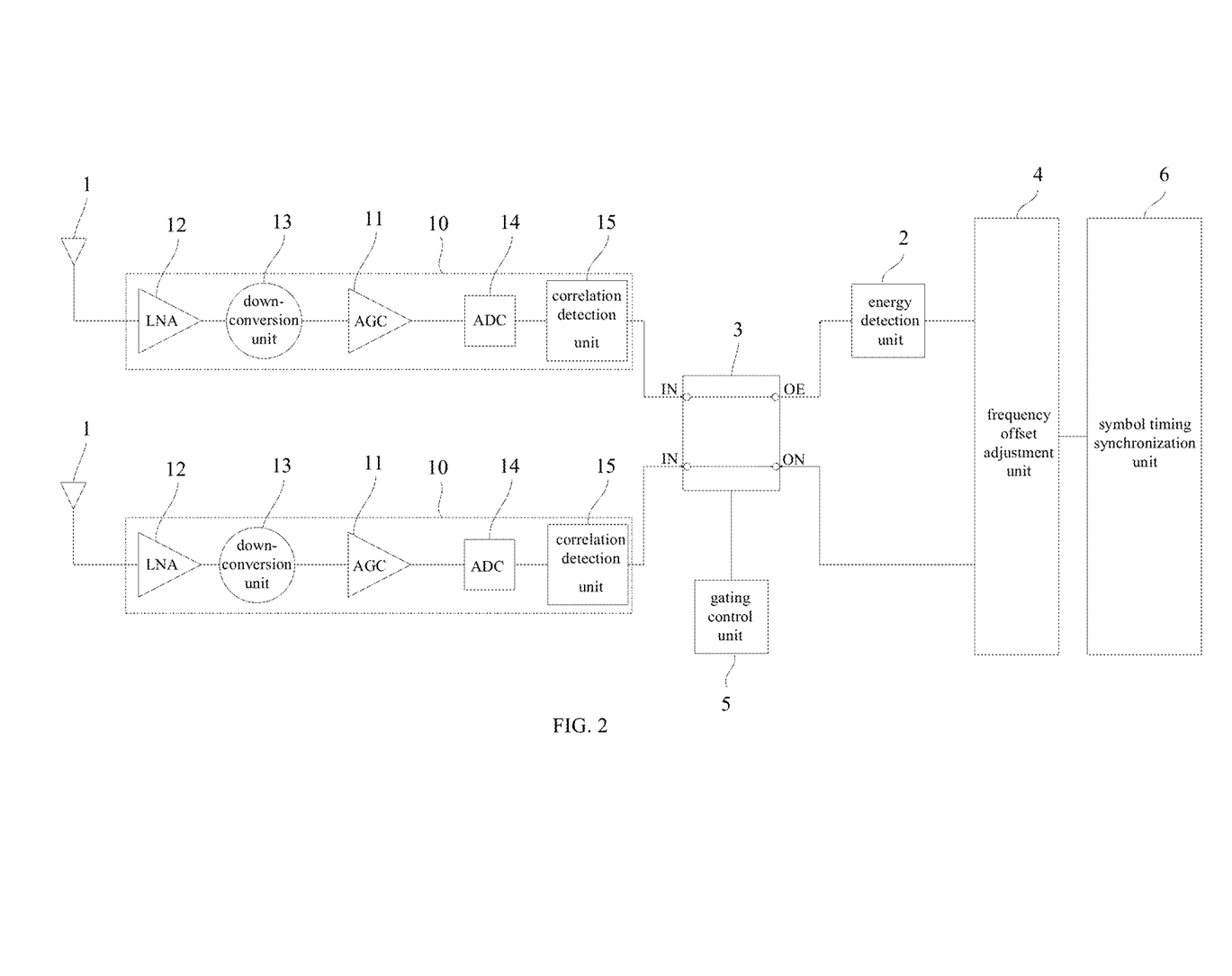
FIG. 2 is a structural block diagram of a MIMO receiver for Wi-Fi according to one or more embodiments of the present disclosure.

To resolve the foregoing problems, embodiments of the present disclosure provide a MIMO receiver for Wi-Fi. As shown in FIG. 2, the receiver includes: n antennas 1, where n≥2; an energy detection unit 2; a multilink gating unit 3; a frequency offset adjustment unit 4; a gating control unit 5; and receiving links 10 one-to-one corresponding to the antennas 1. The multilink gating unit 3 has gating input terminals IN one-to-one corresponding to the receiving links 10. The receiving links 10 each have an input terminal coupled to the corresponding antenna 1 and an output terminal coupled to the corresponding gating input terminal IN of the multilink gating unit 3. The multilink gating unit 3 has one energy detection gating output terminal OE coupled to the frequency offset adjustment unit 4 through the energy detection unit 2 and n−1 non-energy detection gating output terminals ON coupled to the frequency offset adjustment unit 4. The multilink gating unit 3 is configured to connect each of the gating input terminals IN to one of the gating output terminals. The gating control unit 5 is coupled to the multilink gating unit 3, and the gating control unit 5 is configured to periodically obtain signal strengths of the receiving links 10, and control, based on the signal strengths of the receiving links 10, the multilink gating unit 3 to connect the gating input terminal IN corresponding to the receiving link 10 that meets a preset condition to the energy detection gating output terminal OE.

Figure 3:
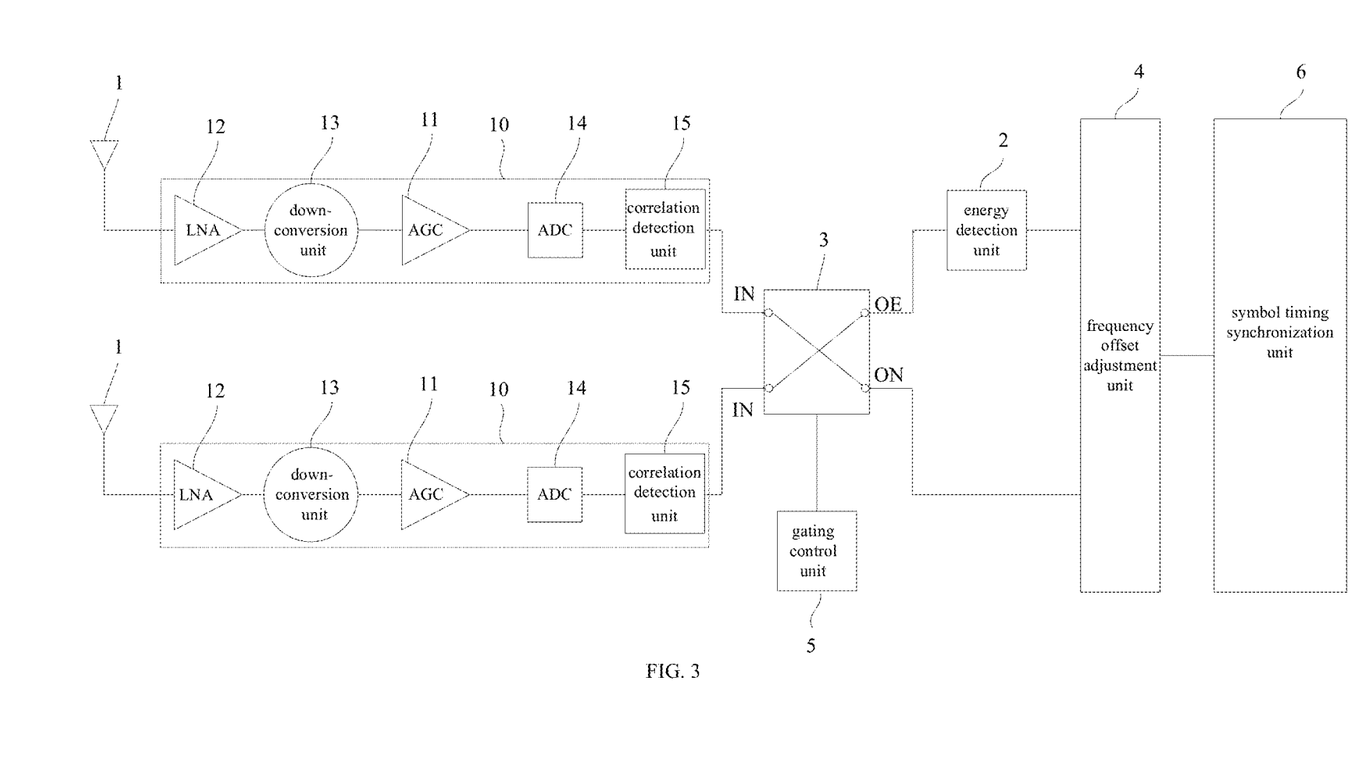
FIG. 3 is a schematic diagram of another state of the receiver in FIG. 2.

In some embodiments, the receiving link 10 is configured to process a signal received by the antenna 1. A processed signal is transmitted to the frequency offset adjustment unit 4 through the energy detection unit 2 or is directly transmitted to the frequency offset adjustment unit 4. In other words, no energy detection unit is disposed between the frequency offset adjustment unit 4 and any non-energy detection gating output terminal ON. That is, an output signal of only one receiving link 10 passes through the energy detection unit 2. Output signals of the other receiving links 10 are directly transmitted to the frequency offset adjustment unit 4. The multilink gating unit 3 is configured to connect the output terminals of the receiving links 10 to the frequency offset adjustment unit 4. The output terminal of only one receiving link 10 is connected to the frequency offset adjustment unit 4 through the energy detection unit 2. The output terminals of the other receiving links 10 are connected to the frequency offset adjustment unit 4 without passing through the energy detection unit. In other words, the energy detection unit 2 performs energy detection on the output signal of only one receiving link 10. When it is detected that an SNR and a received signal strength indication (RSSI) of a received signal are less than thresholds, the energy detection unit 2 is turned on to perform energy detection. For example, n=2, and the receiver includes two antennas 1 and two receiving links 10. The multilink gating unit 3 has two gating states. In a first gating state, as shown in FIG. 2, the gating input terminal IN corresponding to the first receiving link 10 is connected to the energy detection gating output terminal OE, and the gating input terminal IN corresponding to the second receiving link 10 is connected to the non-energy detection gating output terminal ON. In other words, in the first gating state, the energy detection unit 2 detects a signal of only the first receiving link 10, but does not detect a signal of the second receiving link 10. In a second gating state, as shown in FIG. 3, the gating input terminal IN corresponding to the first receiving link 10 is connected to the non-energy detection gating output terminal ON, and the gating input terminal IN corresponding to the second receiving link 10 is connected to the energy detection gating output terminal OE. In other words, in the second gating state, the energy detection unit 2 detects the signal of only the second receiving link 10, but does not detect the signal of the first receiving link 10. The gating control unit 5 may control the multilink gating unit 3 to switch between the first gating state and the second gating state. The gating control unit 5 periodically obtains the signal strengths of the receiving links 10, to select, based on the signal strengths, the receiving link 10 that meets the preset condition, and control the receiving link 10 that meets the preset condition to be connected to the energy detection unit 2. For example, the multilink gating unit 3 is currently in the first gating state. In this case, the gating control unit 5 determines the signal strengths of the receiving links 10 to determine that the signal strength of the second receiving link 10 is greater than that of the first receiving link 10. The gating control unit 5 controls the multilink gating unit 3 to switch to the second gating state, i.e., to connect the second receiving link 10 that has the greatest signal strength to the energy detection unit 2 such that the energy detection unit 2 performs energy detection on the receiving link 10 that has the greatest signal strength. In this way, processing such as frequency offset adjustment can be more effectively performed based on an energy detection result, and signal receiving performance is optimized.

In the MIMO receiver for Wi-Fi in the embodiments of the present disclosure, through control of the multilink gating unit and the gating control unit, the receiving link that meets the preset condition can be connected to the energy detection unit based on the signal strengths such that the energy detection unit can perform energy detection only on a receiving link that meets a signal strength condition. This eliminates the need to dispose an energy detection unit for each receiving link and reduces the quantity of energy detection units. Hardware in the receiver is simplified, and costs and power consumption are reduced. A receiving link switching process of the receiver in embodiments of the present disclosure may be implemented at a physical layer. In this case, software does not need to participate. Because energy detection is performed on only one receiving link, an area of the system on chip (SOC) and the power consumption can be reduced. It is ensured that energy detection is performed on a receiving link that has a maximum signal strength, to optimize signal receiving performance.

In some embodiments, the gating control unit 5 is configured to periodically obtain the signal strengths of the receiving links 10, and control the multilink gating unit 3 to connect the gating input terminal IN corresponding to the receiving link 10 that has the greatest signal strength to the energy detection gating output terminal OE.

In some embodiments, the gating control unit 5 is configured to periodically obtain the signal strengths and SNRs of the receiving links 10, and control the multilink gating unit 3 to connect the gating input terminal IN corresponding to the receiving link 10 that has the greatest signal strength and an SNR falling within a preset SNR range to the energy detection gating output terminal OE.

In general, a greater signal strength indicates a greater SNR. Therefore, an acceptable SNR range is set. After it is determined that a certain receiving link 10 has the greatest signal strength, the SNR is referred to as a reference. If the SNR falls within the preset range, that is, noise is small, the receiving link 10 is connected to the energy detection unit 2. It is assumed that a certain receiving link 10 has the greatest signal strength, but the SNR exceeds the preset range, that is, the signal strength of the receiving link 10 may be great due to interference. Therefore, even if the signal strength is the greatest, switching is not performed in this case because the SNR exceeds the preset range.

In some embodiments, each receiving link 10 includes an AGC unit 11. The foregoing switching may be performed on a signal after AGC adjustment in each receiving link 10. Each receiving link 10 has separate AGC adjustment such that each receiving link 10 can have a maximum dynamic range.

In some embodiments, each receiving link 10 includes an LNA 12, a down-conversion unit 13, and the AGC unit 11 that are sequentially coupled between the input terminal and the output terminal.

Figure 4:
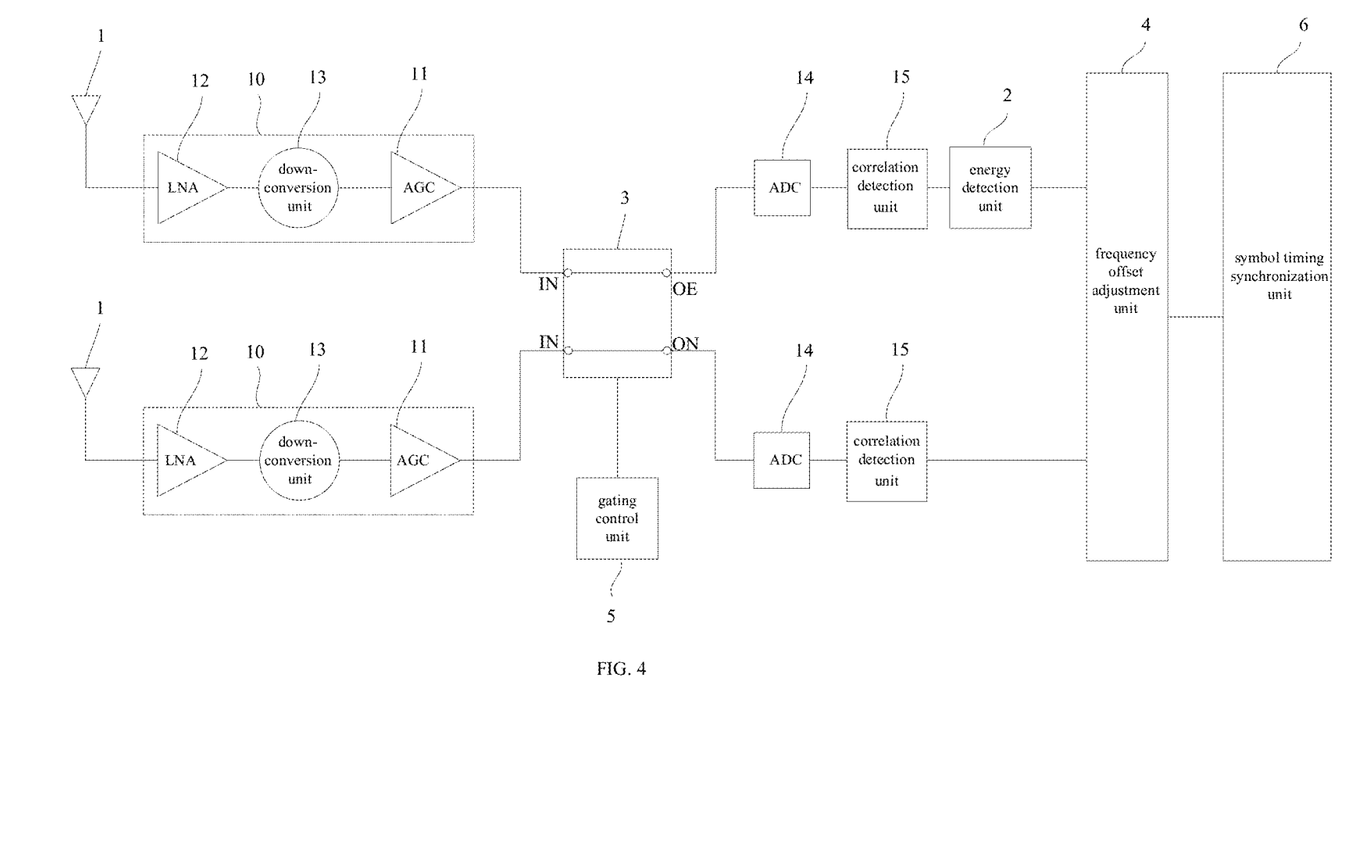
FIG. 4 is a structural block diagram of another MIMO receiver for Wi-Fi according to one or more embodiments of the present disclosure.

In some embodiments, as shown in FIG. 4, the energy detection gating output terminal OE is coupled to the energy detection unit 2 through an ADC 14 and a correlation detection unit 15 in sequence. The non-energy detection gating output terminal ON is coupled to the frequency offset adjustment unit 4 through the ADC 14 and the correlation detection unit 15 in sequence. In other words, only a radio frequency part before the ADC 14 is used as a switchable part of the receiving link 10. After the receiving link 10 is switched, the ADC 14 performs analog-to-digital conversion and the correlation detection unit 15 performs correlation detection. After the correlation is succeeded, the correlation detection unit 15 may be turned off. After being turned off, the correlation detection unit 15 merely no longer performs correlation detection, but does not affect the passing signals. Energy detection is performed on the signal passing through the ADC 14 and the correlation detection unit 15.

Figure 5:
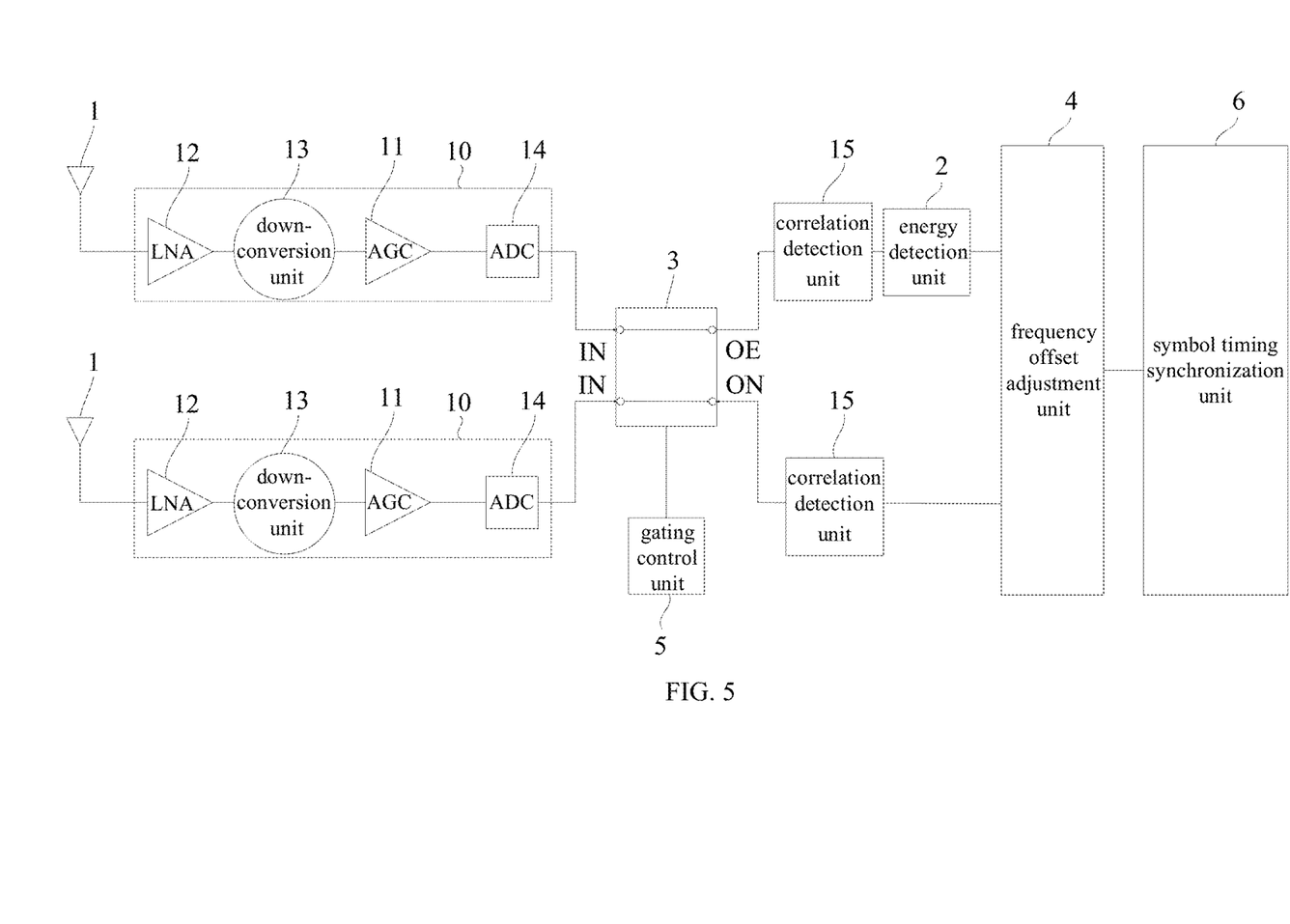
FIG. 5 is a structural block diagram of another MIMO receiver for Wi-Fi according to one or more embodiments of the present disclosure.

In some embodiments, as shown in FIG. 2 and FIG. 5, each receiving link 10 includes the LNA 12, the down-conversion unit 13, the AGC unit 11, and an ADC 14 that are sequentially coupled between the input terminal and the output terminal. In other words, after passing through the ADC 14, the signal on each receiving link 10 may be switched in the multilink gating unit 3.

In some embodiments, as shown in FIG. 5, the energy detection gating output terminal OE is coupled to the energy detection unit 2 through a correlation detection unit 15. The non-energy detection gating output terminal ON is coupled to the frequency offset adjustment unit 4 through a correlation detection unit 15.

In some embodiments, as shown in FIG. 2 and FIG. 3, each receiving link 10 includes the LNA 12, the down-conversion unit 13, the AGC unit 11, an ADC 14, and a correlation detection unit 15 that are sequentially coupled between the input terminal and the output terminal. In other words, after passing through the ADC 14 and the correlation detection unit 15, the signal on each receiving link 10 may be switched in the multilink gating unit 3.

In some embodiments, the gating control unit 5 is configured to periodically obtain RSSIs of Beacon frames of the receiving links 10, and control the multilink gating unit 3 to connect the gating input terminal corresponding to the receiving link 10 that has the greatest RSSI to the energy detection gating output terminal OE. In other words, the signal strength of each receiving link 10 may be determined through the RSSI, and the switching of the multilink gating unit 3 may be controlled based on the signal strength.

In some embodiments, the receiver further includes a symbol timing synchronization unit 6 coupled to the frequency offset adjustment unit 4.

Figure 6:
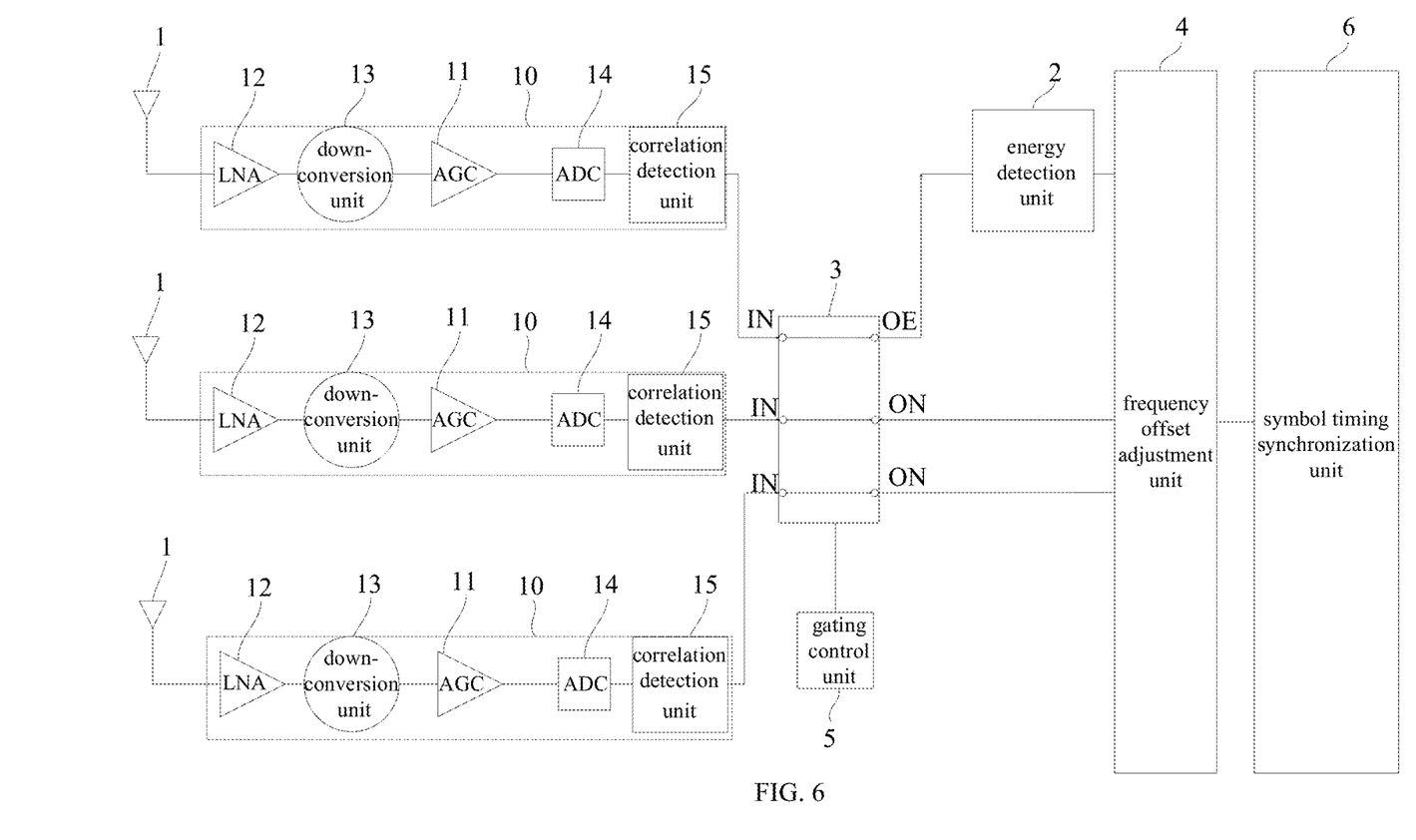
FIG. 6 is a structural block diagram of another MIMO receiver for Wi-Fi according to one or more embodiments of the present disclosure.
Figure 7:
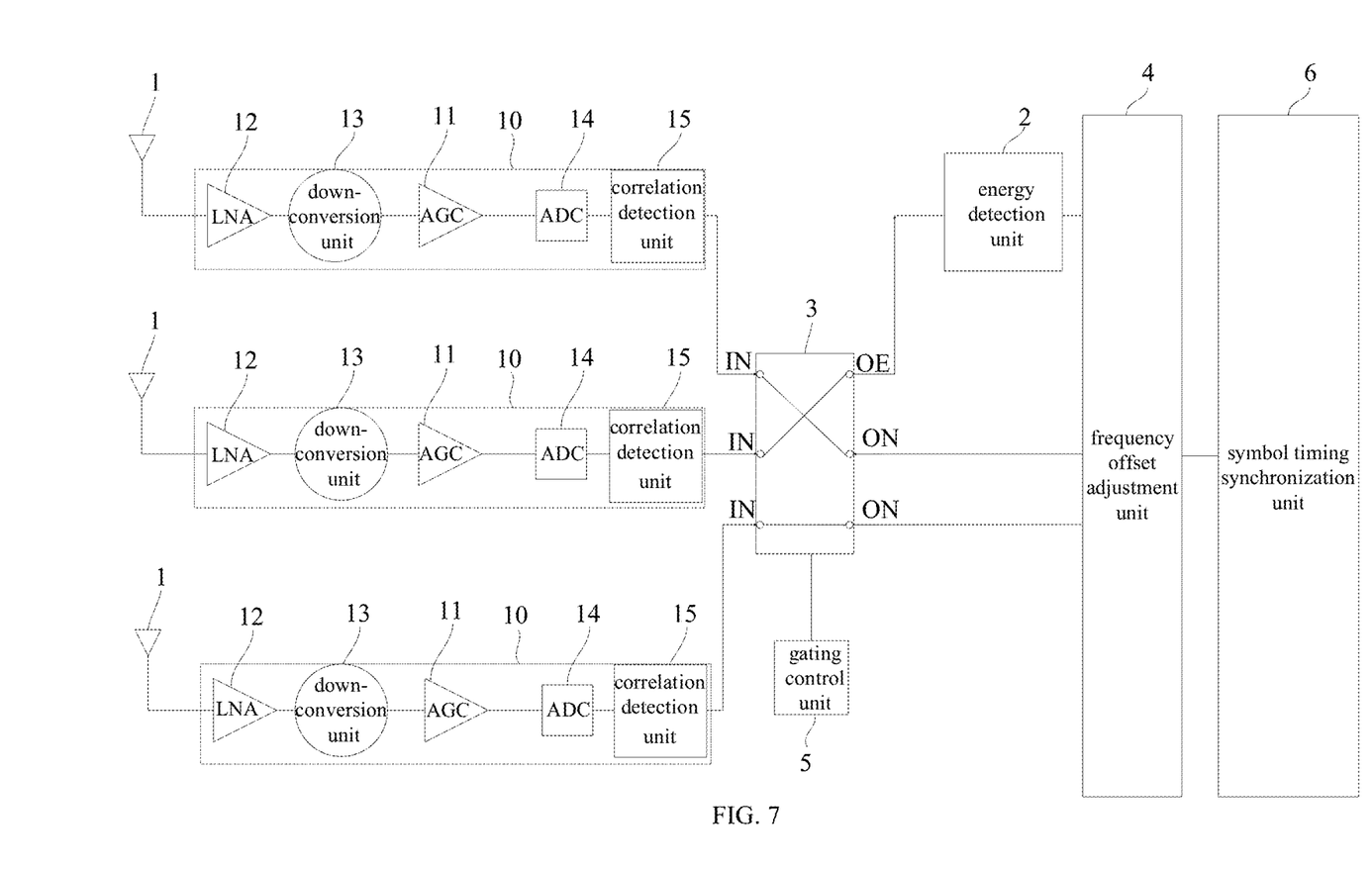
FIG. 7 is a schematic diagram of another state of the receiver in FIG. 6.
Figure 8:
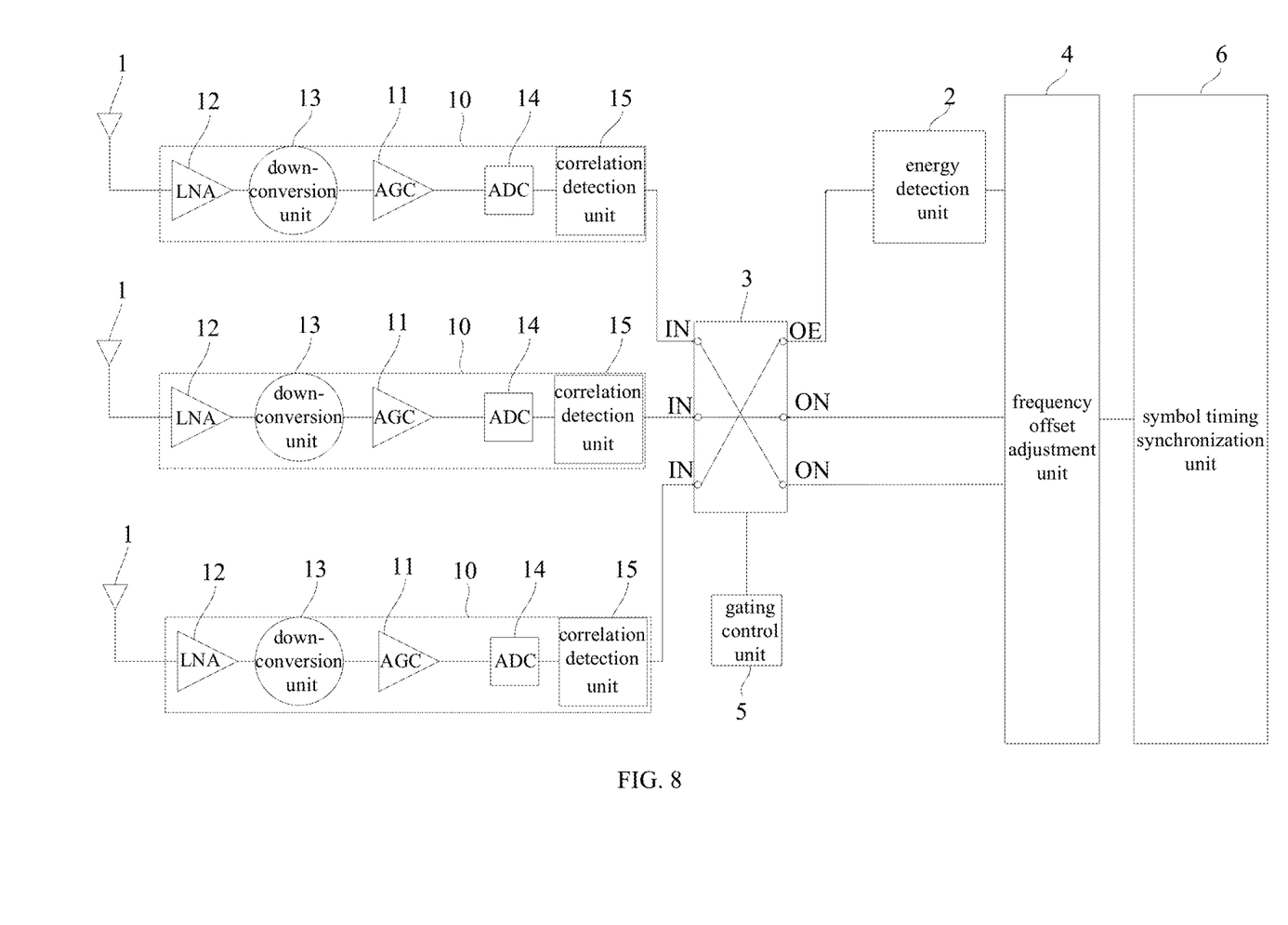
FIG. 8 is a schematic diagram of another state of the receiver in FIG. 6.

The foregoing embodiments use n=2 as an example for description. The following uses n=3 as an example to describe further embodiments of the present disclosure. As shown in FIG. 6, FIG. 7, and FIG. 8, when n=3, the multilink gating unit 3 has three gating input terminals IN, one energy detection gating output terminal OE, and two non-energy detection gating output terminals ON. Each receiving link 10 has a separately modulated AGC unit 11. The plurality of receiving links 10 may be switched by the multilink gating unit 3. For example, if it is determined based on the RSSI of the beacon frame that the first receiving link 10 in the three receiving links 10 has the greatest RSSI, the gating control unit 5 controls the multilink gating unit 3 to switch to a state shown in FIG. 6 to ensure that the receiving link 10 that has the greatest RSSI is connected to the energy detection unit 2. For example, if it is determined based on the RSSI of the beacon frame that the second receiving link 10 in the three receiving links 10 has the greatest RSSI, the gating control unit 5 controls the multilink gating unit 3 to switch to a state shown in FIG. 7 to ensure that the receiving link 10 that has the greatest RSSI is connected to the energy detection unit 2. For example, if it is determined based on the RSSI of the beacon frame that the third receiving link 10 in the three receiving links 10 has the greatest RSSI, the gating control unit 5 controls the multilink gating unit 3 to switch to a state shown in FIG. 8 to ensure that the receiving link 10 that has the greatest RSSI is connected to the energy detection unit 2. After the signal of each receiving link 10 passes through the ADC 14, the correlation detection unit 15 performs correlation detection on a packet header. When the SNR and RSSI is small, the energy detection unit 2 performs energy detection on the packet header on the receiving link 10 currently connected to the energy detection unit. AGC adjustment is performed on each receiving link 10 based on results of the correlation detection and the energy detection. The correlation detection unit 15 may be turned off after the correlation is succeeded. Results of energy detection or correlation detection of the plurality of receiving links after the AGC adjustment are integrated. The frequency offset adjustment unit 4 adjusts a frequency offset. The symbol timing synchronization unit 6 performs symbol timing synchronization. The signal is decoded based on amplitude and the SNR of the received signal after the AGC adjustment, the frequency offset adjustment, and the symbol timing synchronization. A subsequent packet is demodulated.

Embodiments of the present disclosure further provide an electronic device, including the foregoing MIMO receiver for Wi-Fi. A specific structure and principle of the receiver are the same as those in the foregoing embodiments. Details are not described herein again. The electronic device may be a mobile phone, a router, a tablet computer, a PC, a PDA, a smart watch, a netbook, a wearable electronic device, an AR device, a VR device, a vehicle-mounted device, a UAV device, a smart car, a smart sounder, a robot, smart glasses, or the like.

Some or all of the functions in the foregoing embodiments may be implemented by software, hardware, firmware, or any combination thereof. When software is used for implementation, the implementation can be performed in a form of a computer program product in whole or in part. The computer program product includes one or more computer instructions. When the computer program instructions are loaded and executed on a computer, the procedures or functions according to the embodiments of the present disclosure are achieved in whole or in part. The computer may be a general-purpose computer, a dedicated computer, a computer network, or another programmable apparatus. The computer instructions may be stored in a computer-readable storage medium or may be sent from a computer-readable storage medium to another computer-readable storage medium. For example, the computer instructions may be sent from a website, computer, server, or data center to another website, computer, server, or data center in a wired (for example, a coaxial cable, an optical fiber, or a Digital Subscriber Line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (such as a DVD), a semiconductor medium (such as a solid state disk (SSD)), or the like.

In the present disclosure, the term "at least one" refers to one or more, and the term "multiple" refers to two or more. The term "and/or" describes associations between associated objects, and it indicates three types of relationships. For example, "A and/or B" may indicate that A alone, A and B, or B alone. "A" and "B" each may be singular or plural. The character "/" generally indicates that the associated objects are in an "or" relationship. The term "at least one of the followings" or a similar expression refers to any combination of these items, including any combination of single items or plural items. For example, at least one of a, b, and c may represent: a, b, c, a and b, a and c, b and c, or a, b, and c, where a, b, and c may be singular or plural.

The foregoing descriptions are merely preferred examples of this disclosure, and are not intended to limit this disclosure. For a person skilled in the art, various modifications and changes may be made to this disclosure. Any modifications, equivalents, improvements, etc. made within the spirit and principle of the present disclosure shall all fall within the protection scope of the present disclosure.

What is claimed is:

1. A multiple-input multiple-output (MIMO) receiver for Wireless Fidelity (Wi-Fi), comprising:
   n antennas, where n≥2;
   an energy detection circuitry;
   a multilink gating circuitry;
   receiving links one-to-one corresponding to the n antennas, wherein the multilink gating circuitry comprises gating input terminals one-to-one corresponding to the receiving links, and the receiving links each comprise an input terminal coupled to the corresponding antenna and an output terminal coupled to the corresponding gating input terminal of the multilink gating circuitry;
   a frequency offset adjustment circuitry, wherein the multilink gating circuitry comprises one energy detection gating output terminal coupled to the frequency offset adjustment circuitry through the energy detection circuitry and n–1 non-energy detection gating output terminals each coupled to the frequency offset adjustment circuitry, and each of the gating input terminals is connected to one of the gating output terminals through the multilink gating circuitry; and
   a gating control circuitry coupled to the multilink gating circuitry, wherein the gating control circuitry periodically obtains a signal strength of each of the receiving links, and controls, based on the signal strength of each of the receiving links, the multilink gating circuitry to connect the gating input terminal corresponding to the receiving link that meets a preset condition to the one energy detection gating output terminal.

2. The MIMO receiver for Wi-Fi according to claim 1, wherein the gating control circuitry periodically obtains the signal strength of each of the receiving links, and controls the multilink gating circuitry to connect the gating input terminal corresponding to the receiving link having a greatest signal strength to the one energy detection gating output terminal.

3. The MIMO receiver for Wi-Fi according to claim 1, wherein the gating control circuitry periodically obtains the signal strength and a signal-to-noise ratio (SNR) of each of the receiving links, and controls the multilink gating circuitry to connect the gating input terminal corresponding to the receiving link having a greatest signal strength and an SNR within a preset SNR range to the one energy detection gating output terminal.

4. The MIMO receiver for Wi-Fi according to claim 1, wherein each of the receiving links comprises an automatic gain control (AGC) circuitry.

5. The MIMO receiver for Wi-Fi according to claim 4, wherein each of the receiving links comprises a low noise amplifier (LNA), a down-conversion circuitry, and the AGC circuitry that are sequentially coupled between the input terminal coupled to the corresponding antenna and the output terminal coupled to the corresponding gating input terminal of the multilink gating circuitry.

6. The MIMO receiver for Wi-Fi according to claim 5, wherein the one energy detection gating output terminal is coupled to the energy detection circuitry sequentially through an analog-to-digital converter (ADC) and a correlation detection circuitry; and
   each of the n−1 non-energy detection gating output terminals is coupled to the frequency offset adjustment circuitry sequentially through an ADC and a correlation detection circuitry.

7. The MIMO receiver for Wi-Fi according to claim 5, wherein each of the receiving links comprises the LNA, the down-conversion circuitry, the AGC circuitry, and an ADC that are sequentially coupled between the input terminal coupled to the corresponding antenna and the output terminal coupled to the corresponding gating input terminal of the multilink gating circuitry.

8. The MIMO receiver for Wi-Fi according to claim 7, wherein the one energy detection gating output terminal is coupled to the energy detection circuitry through a correlation detection circuitry; and
   each of the n−1 non-energy detection gating output terminals is coupled to the frequency offset adjustment circuitry through a correlation detection circuitry.

9. The MIMO receiver for Wi-Fi according to claim 5, wherein each of the receiving links comprises the LNA, the down-conversion circuitry, the AGC circuitry, an ADC, and a correlation detection circuitry that are sequentially coupled between the input terminal coupled to the corresponding antenna and the output terminal coupled to the corresponding gating input terminal of the multilink gating circuitry.

10. The MIMO receiver for Wi-Fi according to claim 1, wherein the gating control circuitry periodically obtains a received signal strength indication (RSSI) of a Beacon frame of each of the receiving links, and controls the multilink gating circuitry to connect the gating input terminal corresponding to the receiving link having a greatest RSSI to the one energy detection gating output terminal.

11. The MIMO receiver for Wi-Fi according to claim 1, further comprising:
   a symbol timing synchronization circuitry coupled to the frequency offset adjustment circuitry.

12. An electronic device, comprising an multiple-input multiple-output (MIMO) receiver for Wireless Fidelity (Wi-Fi), wherein the MIMO receiver for Wi-Fi comprises:
   n antennas, where n≥2;
   an energy detection circuitry;
   a multilink gating circuitry;
   receiving links one-to-one corresponding to the n antennas, wherein the multilink gating circuitry comprises gating input terminals one-to-one corresponding to the receiving links, and the receiving links each comprise an input terminal coupled to the corresponding antenna and an output terminal coupled to the corresponding gating input terminal of the multilink gating circuitry;
   a frequency offset adjustment circuitry, wherein the multilink gating circuitry comprises one energy detection gating output terminal coupled to the frequency offset adjustment circuitry through the energy detection circuitry and n−1 non-energy detection gating output terminals each coupled to the frequency offset adjustment circuitry, and each of the gating input terminals is connected to one of the gating output terminals through the multilink gating circuitry; and
   a gating control circuitry coupled to the multilink gating circuitry, wherein the gating control circuitry periodically obtains a signal strength of each of the receiving links, and controls, based on the signal strength of each of the receiving links, the multilink gating circuitry to connect the gating input terminal corresponding to the receiving link that meets a preset condition to the one energy detection gating output terminal.

13. The electronic device according to claim 12, wherein the gating control circuitry periodically obtains the signal strength of each of the receiving links, and controls the multilink gating circuitry to connect the gating input terminal corresponding to the receiving link having a greatest signal strength to the one energy detection gating output terminal.

14. The electronic device according to claim 12, wherein the gating control circuitry periodically obtains the signal strength and a signal-to-noise ratio (SNR) of each of the receiving links, and controls the multilink gating circuitry to connect the gating input terminal corresponding to the receiving link having a greatest signal strength and an SNR within a preset SNR range to the one energy detection gating output terminal.

15. The electronic device according to claim 12, wherein each of the receiving links comprises a low noise amplifier (LNA), a down-conversion circuitry, and an automatic gain control (AGC) circuitry that are sequentially coupled between the input terminal coupled to the corresponding antenna and the output terminal coupled to the corresponding gating input terminal of the multilink gating circuitry.

16. The electronic device according to claim 15, wherein the one energy detection gating output terminal is coupled to the energy detection circuitry sequentially through an analog-to-digital converter (ADC) and a correlation detection circuitry; and
   each of the n−1 non-energy detection gating output terminals is coupled to the frequency offset adjustment circuitry sequentially through an ADC and a correlation detection circuitry.

17. The electronic device according to claim 15, wherein each of the receiving links comprises the LNA, the down-conversion circuitry, the AGC circuitry, and an ADC that are sequentially coupled between the input terminal coupled to the corresponding antenna and the output terminal coupled to the corresponding gating input terminal of the multilink gating circuitry.

18. The electronic device according to claim 17, wherein the one energy detection gating output terminal is coupled to the energy detection circuitry through a correlation detection circuitry; and     each of the n−1 non-energy detection gating output terminals is coupled to the frequency offset adjustment circuitry through a correlation detection circuitry.

19. The electronic device according to claim 15, wherein each of the receiving links comprises the LNA, the down-conversion circuitry, the AGC circuitry, an ADC, and a correlation detection circuitry that are sequentially coupled between the input terminal coupled to the corresponding antenna and the output terminal coupled to the corresponding gating input terminal of the multilink gating circuitry.

20. The electronic device according to claim 12, wherein the gating control circuitry periodically obtains a received signal strength indication (RSSI) of a Beacon frame of each of the receiving links, and controls the multilink gating circuitry to connect the gating input terminal corresponding to the receiving link having a greatest RSSI to the one energy detection gating output terminal.

\* \* \* \* \*